US009137523B2

(12) United States Patent
Jun et al.

(10) Patent No.: US 9,137,523 B2
(45) Date of Patent: Sep. 15, 2015

(54) METHOD AND APPARATUS FOR CONTROLLING IMAGE DISPLAY SO THAT VIEWERS SELECTIVELY VIEW A 2D OR A 3D SERVICE

(75) Inventors: Jung Sig Jun, Seoul (KR); Kook Yeon Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 13/640,971

(22) PCT Filed: Apr. 11, 2011

(86) PCT No.: PCT/KR2011/002534
§ 371 (c)(1),
(2), (4) Date: Nov. 20, 2012

(87) PCT Pub. No.: WO2011/129566
PCT Pub. Date: Oct. 20, 2011

(65) Prior Publication Data
US 2013/0063577 A1 Mar. 14, 2013

Related U.S. Application Data

(60) Provisional application No. 61/322,919, filed on Apr. 12, 2010.

(51) Int. Cl.
*H04N 13/04* (2006.01)
*G02B 27/22* (2006.01)

(52) U.S. Cl.
CPC ........ *H04N 13/0438* (2013.01); *G02B 27/2264* (2013.01); *H04N 13/0429* (2013.01); *H04N 13/0452* (2013.01); *H04N 13/0497* (2013.01)

(58) Field of Classification Search
CPC ................................................ H04N 13/0445
USPC ........................................ 348/53, 55, 56, 42
See application file for complete search history.

(56) References Cited

U.S. PATENT DOCUMENTS 6,549,650 B1 * 4/2003 Ishikawa et al. ............. 382/154

2005/0251462 A1 * 11/2005 Nykamp ......................... 705/27

(Continued)

FOREIGN PATENT DOCUMENTS

JP 08-322065 A 12/1996
JP 8-322065 A 12/1996

(Continued)

*Primary Examiner* — Paulos M Natnael
(74) *Attorney, Agent, or Firm* — Birch, Stewart, Kolasch & Birch, LLP

(57) ABSTRACT

The present description discloses a method and apparatus for displaying images. An image display method according to one embodiment of the present invention comprises the following steps: generating, from an inputted source, 3D image data to be outputted; taking, as an input, first information on whether or not there are a plurality of viewers, and, in the event there are a plurality of viewers, on the number of viewers, and second information on the viewing mode of each viewer based on the first information; generating individual synchronization information for the generated 3D image data in response to the viewing mode of each viewer in accordance with the inputted first information and second information; and outputting the generated 3D image data via a screen, and transmitting the generated synchronization information to the 3D eyeglasses of each viewer. In addition, an image display method according to another embodiment of the present invention comprises the following steps: generating, from an inputted source, 3D image data to be outputted and first synchronization information; outputting the generated 3D image data via a screen, and transmitting the generated first synchronization information to each viewer; generating second synchronization information on the basis of the generated first synchronization information in accordance with a received viewing mode switch request; and transmitting the generated second synchronization information to the 3D glasses of the corresponding viewer.

19 Claims, 11 Drawing Sheets

(56) References Cited

U.S. PATENT DOCUMENTS

| | | |
|---|---|---|
| 2007/0097024 A1 | 5/2007 | Jung et al. |
| 2010/0073465 A1 | 3/2010 | Park et al. |
| 2010/0085424 A1 | 4/2010 | Kane et al. |
| 2010/0091091 A1* | 4/2010 | Kim .............................. 348/42 |
| 2011/0199466 A1* | 8/2011 | Kim et al. ..................... 348/55 |
| 2011/0205345 A1* | 8/2011 | Choi et al. .................... 348/56 |
| 2011/0273545 A1* | 11/2011 | Imai et al. ..................... 348/56 |
| 2012/0162367 A1 | 6/2012 | Ha |
| 2013/0063577 A1* | 3/2013 | Jun et al. ....................... 348/53 |

FOREIGN PATENT DOCUMENTS

| | | | |
|---|---|---|---|
| JP | 2006-262191 A | 9/2006 | |
| JP | 2006-319819 S | 11/2006 | |
| KR | 10-2006-0130451 A | 12/2006 | |
| KR | 10-0667823 B1 | 1/2007 | |
| KR | 20090101623 A * | 9/2009 | ........... G02B 27/226 |

* cited by examiner (a)

(b)

(a)

(b)

(c)

METHOD AND APPARATUS FOR CONTROLLING IMAGE DISPLAY SO THAT VIEWERS SELECTIVELY VIEW A 2D OR A 3D SERVICE

This application is the National Phase of PCT/KR2011/002534 filed on Apr. 11, 2011 which claims priority under 35 U.S.C. 119(e) to U.S. Provisional Application No. 61/322,919 filed on Apr. 12, 2010, all of which are hereby expressly incorporated by reference into the present application.

TECHNICAL FIELD

The present invention relates to an image display method and apparatus and, more particularly, to an image display method and apparatus that are capable of controlling image display so that viewers selectively view a two-dimensional (2D) service or a three-dimensional (3D) service simultaneously with respect to a channel (or a service) or content which is provided on a screen and can be served in 3D, controlling image display so that change to another mode is performed during viewing in a 2D mode or a 3D mode, and providing a user interface (UI) to control image display.

BACKGROUND ART

Content containing two-dimensional (2D) images has mainly been used as broadcast content until now from the analog broadcast era even though digital broadcasts are currently active. In recent years, content containing three-dimensional (3D) images (or stereoscopic images) providing realism and a stereoscopic effect has been increasingly used in a specific field of application, as compared with planar 2D images.

By reflecting such a trend, people's interest in 3D image display that is capable of providing 3D image content has increased, and devices for 3D image display have spread to households in recent years.

3D images allow users to experience 3D effects using the principle of stereo vision which provides a sense of perspective through different views of the two eyes which are separated by about 65 mm, i.e. through binocular parallax due to the distance between the two eyes. To this end, the 3D images are provided such that corresponding planar images are viewed with the left and right eyes, thereby allowing the users to experience 3D and perspective effects.

However, the 3D images may not substitute for 2D images but the 3D images and the 2D images may coexist due to characteristics of content or services, although analog broadcasting is completely replaced by digital broadcasting.

DISCLOSURE

Technical Problem

An object of the present invention is to provide an image display method and apparatus that are capable of controlling image display so that viewers selectively view a two-dimensional (2D) service or a three-dimensional (3D) service simultaneously with respect to a channel (or a service) or content which is provided on a screen and can be served in 3D.

Another object of the present invention is to provide an image display method and apparatus that are capable of controlling image display so that change to another mode is performed during viewing in a 2D mode or a 3D mode.

A further object of the present invention is to provide a user interface (UI) to control image display.

Technical Solution

In order to accomplish the above objects, an example of an image display method according to the present invention includes generating three dimensional, 3D, image data to be output from an input source; receiving first information representing whether a plurality of viewers are present and representing the number of viewers in a case in which a plurality of viewers are present and second information representing a viewing mode of each viewer based on the first information; individually generating synchronization information of the generated 3D image data in response to the viewing mode of each viewer according to the received first information and second information; and outputting the generated 3D image data through a screen and transmitting the generated synchronization information to 3D glasses of each viewer.

The viewing mode may include a 2D viewing mode and a 3D viewing mode.

The image display method may further include detecting at least one pair of 3D glasses connected through a wired/wireless network; identifying the detected at least one pair of 3D glasses; and storing identification information representing the identified 3D glasses.

The image display method may further include detecting at least one pair of 3D glasses connected through a wired/wireless network; receiving identification information communicated with the detected at least one pair of 3D glasses; and identifying the detected at least one pair of 3D glasses by comparing the received identification information with previously stored identification information.

The synchronization information may include information to control both lenses of the 3D glasses to be shut at each time when left eye image data or right eye image data constituting the generated 3D image data are output for a viewer selecting the 2D viewing mode.

Another example of the image display method according to the present invention includes generating 3D image data to be output from an input source and first synchronization information; outputting the generated 3D image data through a screen and transmitting the generated first synchronization information to each viewer; generating second synchronization information based on the generated first synchronization information according to a request for changing viewing mode; and transmitting the generated second synchronization information to 3D glasses of the corresponding viewer.

The image display method may further include receiving first information representing whether a plurality of viewers are present and representing the number of viewers in a case in which a plurality of viewers are present and second information representing a viewing mode of each viewer based on the first information; and individually generating the first synchronization information of the generated 3D image data in response to the viewing mode of each viewer according to the received first information and second information.

The image display method may further include identifying a viewer requesting for changing the viewing mode, wherein the generated second synchronization information is transmitted to 3D glasses of the identified viewer.

An example of an image display apparatus according to the present invention includes an external input receiving part configured to receive first information representing whether a plurality of viewers are present and representing the number of viewers in a case in which a plurality of viewers are present and second information representing a viewing mode of each viewer based on the first information; a three dimensional, 3D, image formatter configured to generate 3D image data to be output from an input source and to individually generate synchronization information in response to the viewing mode of each viewer according to the received first information and second information for the generated 3D image data; an IR emitter configured to transmit the individually generated synchronization information to 3D glasses of each viewer; and an outputting part configured to output the generated 3D image data.

The image display apparatus may further include a communication module configured to detect at least one pair of 3D glasses connected through a wired/wireless network; an identifying part configured to identify the detected at least one pair of 3D glasses; and a storage part configured to store identification information for the identified 3D glasses.

The image display apparatus may further include a communication module configured to detect at least one pair of 3D glasses connected through a wired/wireless network and to communicate with the detected at least one pair of 3D glasses to receive identification information; and an identifying part configured to compare the received identification information with previously stored identification information to identify the detected at least one pair of 3D glasses.

The 3D image formatter may generate synchronization information to control both lenses of the 3D glasses to be shut at each time when left eye image data or right eye image data constituting the generated 3D image data are output for a viewer selecting a 2D viewing mode based on the received second information.

Another example of the image display apparatus according to the present invention includes a three dimensional, 3D, image formatter configured to generate 3D image data to be output from an input source and first synchronization information; an IR emitter configured to transmit the generated first synchronization information to 3D glasses of each viewer; an outputting part configured to output the generated 3D image data on a screen; and an external input receiving part configured to receive a request for changing viewing mode from a viewer, wherein the 3D image formatter generates second synchronization information based on the generated first synchronization information according to the received request for changing viewing mode and outputs the generated second synchronization information to the 3D glasses of the corresponding viewer via the IR emitter.

The external input receiving part may further receive first information representing whether a plurality of viewers are present and representing the number of viewers in a case in which a plurality of viewers are present and second information representing a viewing mode of each viewer based on the first information.

The 3D image formatter may individually generate the first synchronization information of the generated 3D image data in response to the viewing mode of each viewer according to the received first information and second information.

The image display apparatus may further include a communication module configured to detect at least one pair of 3D glasses connected through a wired/wireless network; an identifying part configured to identify the detected at least one pair of 3D glasses; and a storage part configured to store identification information for the identified 3D glasses.

The image display apparatus may further include a communication module configured to detect at least one pair of 3D glasses connected through a wired/wireless network and to receive identification information communicated with the detected at least one pair of 3D glasses; and an identifying part configured to identify the detected at least one pair of 3D glasses by comparing the received identification information with previously stored identification information.

The image display apparatus may further include a communication module configured to identify a viewer requesting for changing the viewing mode.

Advantageous Effects

The present invention has the following effects.

First, it is possible for viewers to selectively view a two-dimensional (2D) service or a three-dimensional (3D) service simultaneously with respect to a channel (or a service) or content which is provided on a screen and can be served in 3D.

Second, it is possible to perform change to another mode during viewing in a 2D mode or a 3D mode.

Third, it is possible to easily control image display using a user interface (UI).

BEST MODEL

Figure 1:
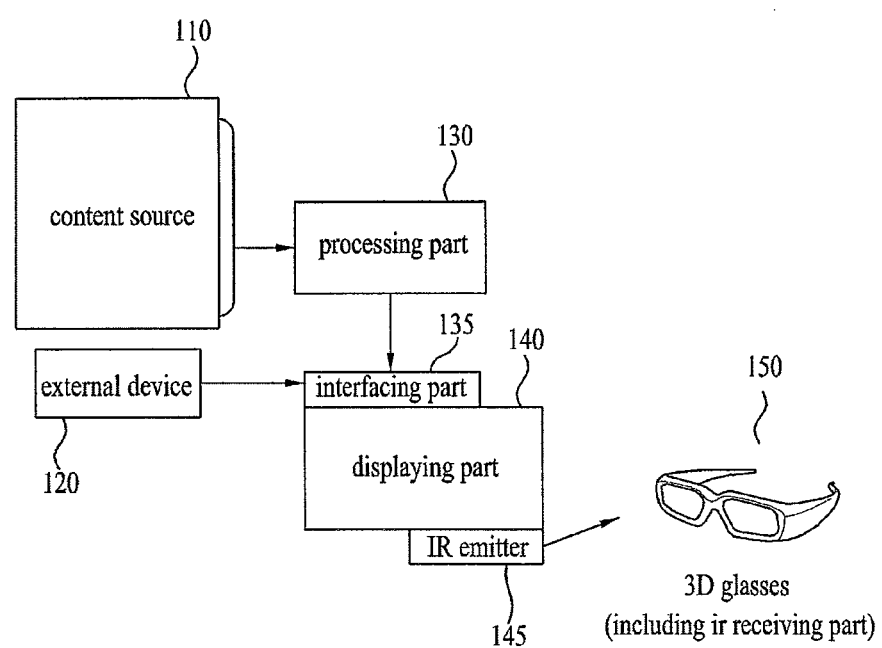
FIG. 1 is a view illustrating an example of an image display apparatus according to the present invention.

Now, preferred embodiments of the present invention will be described in detail with reference to the accompanying drawings and details stated in the accompanying drawings. It should be noted herein that the protection scope of the invention is not limited or restricted to the embodiments described in this specification.

Terminologies used in this specification are selected from general terminologies that are widely used at present if possible while considering functions in the present invention. However, such terminologies may be changed according to intention of those skill in the art to which the present invention pertains, conventional practices, or appearance of new technology. In a specific case, the applicant selects the terminologies voluntarily as required. In this case, since meanings of the voluntary terminologies will be described in the following description of the present invention in detail. Thus, it should be noted that terminologies used in this specification be interpreted based on the detailed description of the present invention and the intended meanings of the terms rather than their simple names.

Hereinafter, various embodiments of an image display method and apparatus according to the present invention will be described in detail with reference to the accompanying drawings.

Especially, in this specification, various illustrations of an image display method and apparatus that are capable of controlling image display so that viewers selectively view a two-dimensional (2D) service or a three-dimensional (3D) service simultaneously with respect to a channel (or a service) or content which is provided on a screen and can be served in 3D, an image display method and apparatus that are capable of controlling image display so that change to another mode is performed during viewing in a 2D mode or a 3D mode, and a user interface (UI) to control image display will be provided and described.

For better understanding and ease explanation of the present invention, an image display apparatus may be exemplified by a digital receiver that includes a component for 3D service processing. The digital receiver may include a digital television receiver, a receiving set that includes a settop box including a component for 3D service processing and a digital unit for outputting 3D images processed by the set-top box, a Personal Digital Assistant (PDA), a mobile phone, and a smart phone. That is, the digital receiver may include any device which receives, processes, and/or provides 3D image data. Also, the digital receiver may be a 3D only receiver or a receiver for both 2D and 3D.

Methods of expressing 3D images include a stereoscopic image display method which takes into consideration 2 views and a multi-view image display method which takes into consideration 3 or more views. On the other hand, the conventional single-view image display method is also referred to as a monoscopic image display method.

The stereoscopic image display method uses a pair of left and right eye images acquired by capturing the same subject using two cameras, i.e. a left camera and a right camera, which are spaced apart from each other by a predetermined distance. On the other hand, the multi-view image display method uses 3 or more images acquired by capturing the same subject using 3 or more cameras having predetermined distances or angles.

Although the present invention will hereinafter be described with reference to the stereoscopic image display method as an example, the technical concept of the present invention can also be applied to the multi-view image display method according to the same or similar principle.

Transmission formats of a stereoscopic image are classified into single video stream formats and multi video stream formats.

The single video stream formats include side-by-side, top/down, interlaced, frame sequential, checker board, and anaglyph formats. On the other hand, the multi video stream formats include full left/right, full left/half right, and 2D video/depth formats.

A stereoscopic image or a multi-view image may be transmitted after being compressed and encoded through various image compression coding schemes including Moving Picture Experts Group (MPEG).

For example, a stereoscopic image in the side-by-side, top/down, interlaced, or checker board format may be transmitted after being compressed and encoded through an H.264/Advanced Video Coding (AVC) scheme. Here, a receiving system may obtain a 3D image by decoding the stereoscopic image in a reverse manner of the H.264/AVC coding scheme.

A left view image among full left/half right view images or one of multi-view images is a base layer image and the remaining images are assigned as enhanced layer images. The base layer image may be transmitted after being encoded using the same scheme as a monoscopic image. On the other hand, the enhanced layer image may be transmitted after only correlation information between the base layer and enhanced layer images is encoded. For example, JPEG, MPEG-1, MPEG-2, MPEG-4, H.264/AVC, or the like may be used as a compression coding scheme of the base layer image. H.264/Multi-view Video Coding (MVC) may be used as a compression coding scheme of the upper layer image. Here, the stereoscopic image is allocated as a base layer image and an enhanced layer image, whereas the multi-view image is allocated as a base layer image and a plurality of enhanced layer images. A reference for dividing the multi-view image into a base layer image and one or more enhanced layer images may be determined based on the positions of cameras or based on the arrangement of the cameras. Alternatively, such a reference for division may also be arbitrarily determined without a specific criterion.

Such 3D image display types are broadly classified into a stereoscopic type, a volumetric type, and a holographic type. For example, a 3D image display device that employs such stereoscopic technology adds depth information to a 2D image and allows users to experience 3D liveliness and realism through such depth information.

3D image viewing types are broadly classified into a glasses type and a glass-free type.

The glasses type is classified into a passive type and an active type. The passive type uses polarized light filters to allow a user to separately view a left eye image and a right eye image. The passive type also includes a type which allows the user to view 3D images using blue and red colored glasses with respect to the two eyes. On the other hand, the active type separates left and right view images using liquid crystal shutters which sequentially open and shut left and right glasses over time to separate left eye and right eye images. In the active type, time-divided screens are periodically repeated, and electronic shutters which are synchronized with the period are mounted on glasses which the user wears to view 3D images. Such an active type is also referred to as a time split type or a shuttered glass type.

Typical glass-free types include a lenticular type in which a lenticular lens plate, on which a cylindrical lens array is vertically arranged, is installed at a front side of a display panel and a parallax barrier type in which a barrier layer having periodic slits is provided on top of a display panel. Hereinafter, the present invention will be described with reference to the glasses type as an example for ease of explanation.

An example of an image display apparatus according to the present invention includes an external input receiving part configured to receive first information representing whether a plurality of viewers are present and representing the number of viewers in a case in which a plurality of viewers are present and second information representing a viewing mode of each viewer based on the first information; a three dimensional, 3D, image formatter configured to generate 3D image data to be output from an input source and to individually generate synchronization information in response to the viewing mode of each viewer according to the received first information and second information for the generated 3D image data; an IR emitter configured to transmit the individually generated synchronization information to 3D glasses of each viewer; and an outputting part configured to output the generated 3D image data.

The image display apparatus may further include a communication module configured to detect at least one pair of 3D glasses connected through a wired/wireless network; an identifying part configured to identify the detected at least one pair of 3D glasses; and a storage part configured to store identification information for the identified 3D glasses.

The image display apparatus may further include a communication module configured to detect at least one pair of 3D glasses connected through a wired/wireless network and to communicate with the detected at least one pair of 3D glasses to receive identification information; and an identifying part configured to compare the received identification information with previously stored identification information to identify the detected at least one pair of 3D glasses.

The 3D image formatter may generate synchronization information to control both lenses of the 3D glasses to be shut at each time when left eye image data or right eye image data constituting the generated 3D image data are output for a viewer selecting a 2D viewing mode based on the received second information.

Another example of the image display apparatus according to the present invention includes a three dimensional, 3D, image formatter configured to generate 3D image data to be output from an input source and first synchronization information; an IR emitter configured to transmit the generated first synchronization information to 3D glasses of each viewer; an outputting part configured to output the generated 3D image data on a screen; and an external input receiving part configured to receive a request for changing viewing mode from a viewer, wherein the 3D image formatter generates second synchronization information based on the generated first synchronization information according to the received request for changing viewing mode and outputs the generated second synchronization information to the 3D glasses of the corresponding viewer via the IR emitter.

The external input receiving part may further receive first information representing whether a plurality of viewers are present and representing the number of viewers in a case in which a plurality of viewers are present and second information representing a viewing mode of each viewer based on the first information.

The 3D image formatter may individually generate the first synchronization information of the generated 3D image data in response to the viewing mode of each viewer according to the received first information and second information.

The image display apparatus may further include a communication module configured to detect at least one pair of 3D glasses connected through a wired/wireless network; an identifying part configured to identify the detected at least one pair of 3D glasses; and a storage part configured to store identification information for the identified 3D glasses.

The image display apparatus may further include a communication module configured to detect at least one pair of 3D glasses connected through a wired/wireless network and to receive identification information communicated with the detected at least one pair of 3D glasses; and an identifying part configured to identify the detected at least one pair of 3D glasses by comparing the received identification information with previously stored identification information.

The image display apparatus may further include a communication module configured to identify a viewer requesting for changing the viewing mode.

FIG. 1 is a view illustrating an example of an image display apparatus according to the present invention.

Referring to FIG. 1, the image display apparatus broadly includes a processing part 130 to process sources received from a content source 110 and a displaying part 140 to output audio/video data (AV data) processed by the processing part 130. The image display apparatus may receive sources from an external device 120 in addition to the content source 110. To this end, the image display apparatus may further include an interfacing part 135 to interface between the external device 120 and the image display apparatus and an infrared (IR) emitter 145 to output a synchronization signal, such as synchronization information, generated so that a viewer views a 3D image output from the displaying part 140 using 3D glasses 150.

In the image display apparatus of FIG. 1, the processing part 130 and the displaying part 140 may be a digital receiver set. Alternatively, the processing part 130 may be a kind of settop box, and the displaying part 140 may function as a display device only to output a signal processed by the settop box. Also, in this case, the displaying part 140 may receive and output a 3D image processed by the processing part 130 via the interfacing part 135.

The interfacing part 135, which interfaces output from the external device 120 or, in a specific case, from the processing part 130 to the displaying part 140, may be, for example, a high-definition multimedia interface (HDMI) interface (I/F) that is capable of supporting a 3D service.

The 3D glasses 150 may include a receiving part (not shown) to receive a signal output from the IR emitter 145. As will hereinafter be described, the 3D glasses 150 may further include a viewing mode change unit in connection with the present invention. Also, the 3D glasses may further include a generating part (not shown) to individually generate synchronization information according to the viewing mode change unit. Also, in this case, the viewing mode change unit may transmit a viewing mode change request to the image display device, and the synchronization information generated by the 3D glasses 150 may be received from the image display device. Alternatively, the synchronization information may be generated with reference to synchronization information already received from the image display device. Also, the 3D glasses 150 may further include a storage part to store synchronization information already received from the image display device. In connection with the present invention, a 3D image may be contained in a signal or a source transmitted from the content source 110, such as terrestrial broadcasting, cable broadcasting, satellite broadcasting, an optical disc, and internet protocol television (IPTV) broadcasting, and may be received by the processing part 130. Alternatively, the 3D image may be received from the external device 120, such as a universal serial bus (USB) and a game console, to the processing part 120, or may be directly input to the displaying part 140.

In a case of input via the external device, a 3D image having various formats, such as DivX, component, AV, and Syndicat des Constructeurs d'Appareils Radiorecepteurs et Televiseurs, Radio and Television Receiver Manufacturers' Association (Scart), may be input. The image display device may include a configuration to process the above formats.

Figure 2:
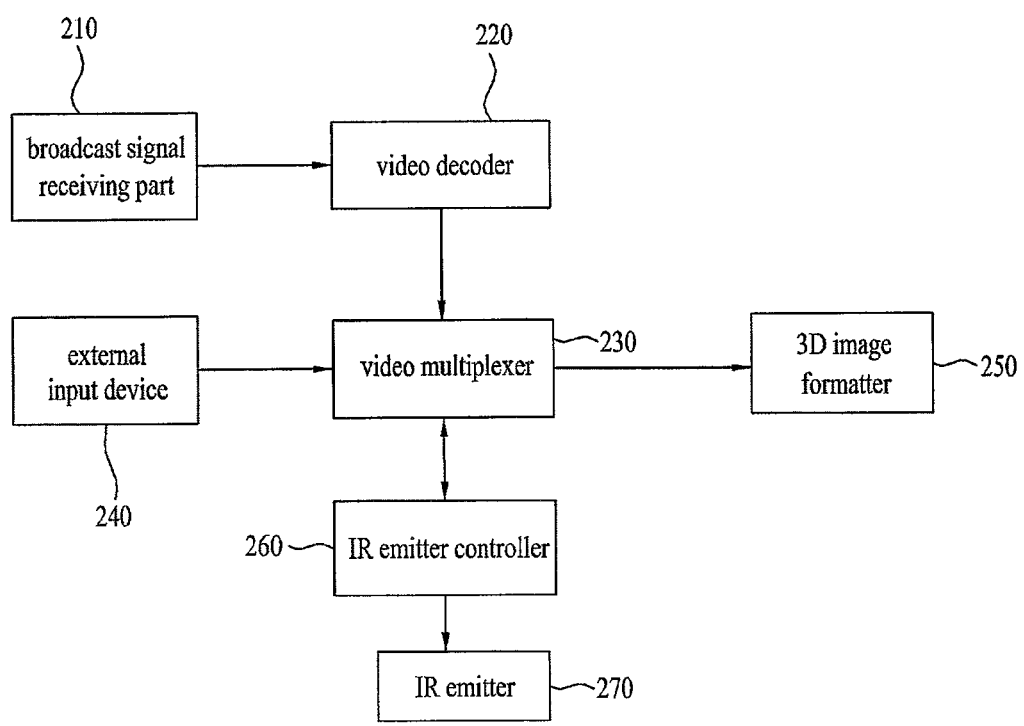
FIG. 2 is a view illustrating another example of a 3D image display apparatus according to the present invention.

FIG. 2 is a view illustrating another example of a 3D image display apparatus according to the present invention. FIG. 2 may be a block diagram of a concrete configuration of for example, the processing part 130 of FIG. 1.

Referring to FIG. 2, the image display apparatus according to the present invention includes a broadcast signal receiving part 210, a video decoder 220, a video multiplexer 230, an external input device 240, a 3D image formatter 250, an IR emitter controller 260, and an IR emitter 270.

Hereinafter, concrete operations of the respective configurations will be described.

The broadcast signal receiving part 210 receives and processes a broadcast signal containing 3D image data in connection with the present invention from the content source 110.

The broadcast signal receiving part 210 may include at least one selected from among, for example, a tuner, a demodulator, a channel browser, a demultiplexer, a signaling information processor, and a controller. The controller may be separately provided outside the broadcast signal receiving part 210 to perform overall control of the image display device.

The tuner/demodulator receives and demodulates a broadcast signal transmitted through radio frequency (RF).

The demultiplexer demultiplexes an audio signal, a video signal, and signaling information from the input broadcast signal. The demultiplexer may demultiplex the broadcast signal through filtering using a Packet IDentifier (PID). Also, the signaling information will be described, for example, as system information (SI), such as Program Specific Information/Program and System Information Protocol (PSI/PSIP) and Digital Video Broadcasting-Service Information (DVB-SI), for the convenience of description. The demultiplexer outputs the demultiplexed video signal to the video decoder 220, which is at the rear of the demultiplexer, and outputs the signaling information to the signaling information processor.

The signaling information processor processes the signaling information input from the demultiplexer and outputs the processed signaling information to the controller. The signaling information processor may include a database (DB) to temporarily store the processed signaling information inside or outside the signaling information processor. The signaling information may contain attribute information regarding content in connection with the present invention. The attribute information of content may include information to identify whether content is 2D/3D content, information regarding 3D video formats (for example, top and bottom (TaB), side by side (SbS), etc.) in a case in which the content is 3D content, and information regarding start time and end time.

The signaling information processor determines whether there is attribute information informing whether content in the signaling information is 2D images or 3D images. Upon determining that there is attribute information, the signaling information processor extracts the attribute information, identifies attributes of the content, i.e. whether the content is 2D/3D content, and transmits the identification result to the controller. On the other hand, upon determining that there is no attribute information, the signaling information processor reports to the controller that no attribute information is in the signaling information. In the latter case, upon receiving the report from the signaling information processor that no attribute information of the content is contained, the controller may determine attributes of additionally input content.

The video decoder 220 receives and decodes video data contained in the broadcast signal. The video data may be configured in the form of a video stream compressed using a format, such as H.264 or MPEG-2. For example, the decoded video data output from the video decoder 220 may include image frames of 60 frames per second (fps).

The external input device 240 includes a Blu-ray player, a Digital Versatile Disc (DVD) player, or a game player. That is, the external input device 240 outputs video data for display output via a route or path in addition to the broadcast signal. For example, the video data output from the external input device 240 may include image frames of 60 fps.

The video multiplexer 230 multiplexes image frames contained in a plurality of video data. In other words, the video multiplexer 230 frame-sequentially multiplexes and outputs image frames contained in a plurality of video data according to a display mode (2D or 3D). For example, the video multiplexer 230 may frame-sequentially multiplex the image frames output from the video decoder 220 and the image frames output from the external input device 240 to output image frames at 120 fps.

The IR emitter controller 260 generates a control sequence to control the 3D glasses 150 according to the sequence of the image frames multiplexed by the video multiplexer 230 and transmits the generated control sequence to the IR emitter 270.

The 3D image formatter 250 formats and outputs the 3D images according to the frequency, characteristics, and format of the displaying part 140 so that the image frames multiplexed by the video multiplexer 230 are frame-sequentially displayed.

The operations of the video multiplexer 230 and the 3D image formatter 250 may be controlled by the controller or a display controller. In this case, the IR emitter controller 260 communicates with the display controller to generate a control sequence according to video data multiplexed by the video multiplexer 230.

The video multiplexer 230 does not always multiplex the video frames output from the video decoder 220 and the external input device 240. The video multiplexer 230 may serve as a buffer according to request of viewers. In this case, information on video frames output from the IR emitter controller may be controlled by the 3D image formatter 250.

Also, upon determining that the input content is 2D image data as the result of the attributes of the input content, the image display device may control the 3D image formatter 250 to be bypassed.

Hereinafter, a method of controlling image display in the image display apparatus with the above-stated configuration according to the present invention will be described.

An example of an image display method according to the present invention includes generating three dimensional, 3D, image data to be output from an input source; receiving first information representing whether a plurality of viewers are present and representing the number of viewers in a case in which a plurality of viewers are present and second information representing a viewing mode of each viewer based on the first information; individually generating synchronization information of the generated 3D image data in response to the viewing mode of each viewer according to the received first information and second information; and outputting the generated 3D image data through a screen and transmitting the generated synchronization information to 3D glasses of each viewer.

The viewing mode may include a 2D viewing mode and a 3D viewing mode. The image display method may further include detecting at least one pair of 3D glasses connected through a wired/wireless network; identifying the detected at least one pair of 3D glasses; and storing identification information representing the identified 3D glasses.

The image display method may further include detecting at least one pair of 3D glasses connected through a wired/wireless network; receiving identification information communicated with the detected at least one pair of 3D glasses; and identifying the detected at least one pair of 3D glasses by comparing the received identification information with previously stored identification information.

The synchronization information may include information to control both lenses of the 3D glasses 150 to be shut at each time when left eye image data or right eye image data constituting the generated 3D image data are output for a viewer selecting the 2D viewing mode.

Another example of the image display method according to the present invention includes generating 3D image data to be output from an input source and first synchronization information; outputting the generated 3D image data through a screen and transmitting the generated first synchronization information to each viewer; generating second synchronization information based on the generated first synchronization information according to a request for changing viewing mode; and transmitting the generated second synchronization information to 3D glasses of the corresponding viewer.

The image display method may further include receiving first information representing whether a plurality of viewers are present and representing the number of viewers in a case in which a plurality of viewers are present and second information representing a viewing mode of each viewer based on the first information; and individually generating the first synchronization information of the generated 3D image data in response to the viewing mode of each viewer according to the received first information and second information.

The image display method may further include identifying a viewer requesting for changing the viewing mode, wherein the generated second synchronization information is transmitted to 3D glasses of the identified viewer.

Figure 3:
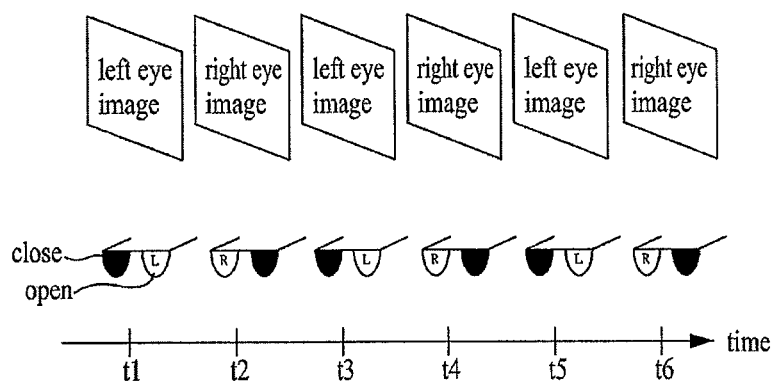
FIG. 3 is a view illustrating an example of a three-dimensional (3D) image display method according to the present invention.

FIG. 3 is a view illustrating an example of a 3D image display method according to the present invention.

Referring to FIG. 3, a time axis is provided, and passage of time from left to right is denoted by t1 to t6.

3D images are output in such a manner that left eye image data and right eye image data are alternately output over time, i.e. from t1 to t6. In other words, left eye image data are output at time t1, and right eye image data are output at time t2. In this way, left eye image data and right eye image data are alternately output at time t3 to time t6.

In this case, a viewer must synchronize the 3D glasses 150 with image data output at each time in order to view 3D images through the 3D glasses 150.

For example, when left eye image data are output at time t1, a right lens of the 3D glasses 150 of the viewer must be shut at time t1, and a left lens of the 3D glasses 150 of the viewer must be opened at time t1 so that the viewer properly views 3D image output through a screen. Also, when right eye image data are output at time t2, the right lens of the 3D glasses 150 of the viewer must be opened, and the left lens of the 3D glasses 150 of the viewer must be shut so that the viewer properly views 3D images.

In this way, the lenses of the 3D glasses 150 must be opened and shut in a state in which the 3D glasses 150 of the viewer are synchronized with the image data output at each time so that the viewer properly views 3D images. To this end, the 3D glasses 150 receive synchronization information generated when the 3D images are generated through the IR emitter 270 of the image display apparatus to control opening and shutting of the respective lenses. In this case, as previously described, the 3D glasses 150 may parse and store the synchronization information.

Figure 4:
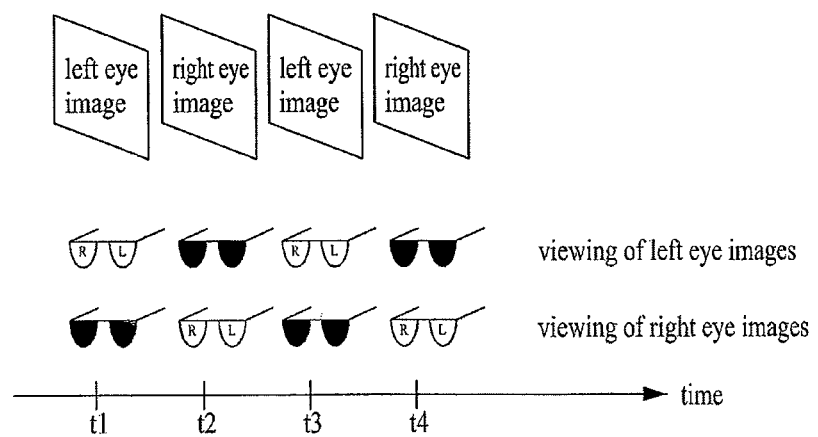
FIG. 4 is a view illustrating a 3D glasses control method for viewing 3D images in a two-dimensional (2D) mode in a case in which the 3D images are output according to the present invention.

FIG. 4 is a view illustrating a 3D glasses control method for viewing 3D images in a 2D mode in a case in which the 3D images are output according to the present invention.

FIG. 4 illustrates a case in which a viewer does not view output 2D images without the 3D glasses but, during outputting of 3D images, a viewer wearing the 3D glasses 150 changes a viewing mode to a 2D mode and views the 3D images in the 2D mode without removing the 3D glasses.

Referring to FIG. 4, left eye image data, right eye image data, left eye image data, and right eye image data are alternately displayed through a screen from time t1 to time t4.

In FIG. 3, when the 3D images are output, the lenses of the 3D glasses are opened and shut with synchronization with the respective image data so that the 3D images are viewed in the 3D mode. In FIG. 4, on the other hand, the 3D images are viewed in the 2D mode.

Output 3D images may be viewed in the 2D mode using the following two methods. One is for the image display apparatus to change the 3D images into 2D images and output the 2D images. The other is for the image display apparatus to output the 3D images while controlling the 3D glasses 150. Hereinafter, the latter case will be described. In the former case, however, if the viewer still wears the 3D glasses 150, it is necessary to correct synchronization information. This is because previous synchronization information has been generated to be suitable for 3D image output.

FIG. 4 shows a case in which only left eye image data or right eye image data are viewed so that the images are viewed in the 2D mode.

A viewer may select a viewing mode change, i.e. change from a 3D mode to a 2D mode, using an input unit, such as a remote controller. When the viewer selects 2D viewing mode change, the image display device may select left eye image data or right eye image data constituting 3D images by default, and may generate and provide synchronization information based thereupon.

The 3D glasses 150 control the lenses to be opened or shut based on the synchronization information provided from the image display device after selection of the viewing mode change so that the viewer views the output 3D images in the 2D mode although the viewer wears the 3D glasses 150.

In the above description, the image display device selects left eye image data or right eye image data by default. Alternatively, the image display device may configure and provide a user interface (UI) to a viewer so that the viewer selects left eye image data or right eye image data, and may generate and transmit synchronization information regarding images selected by the viewer through the provided UI. The 3D glasses 150 may control the lenses to be opened or shut according to the synchronization information as previously described so that the viewer views 2D images although 3D images are output and the viewer wears the 3D glasses 150.

In the above, the image display device may generate synchronization information provided after the viewing mode change based on the initially transmitted synchronization information.

In a case in which the viewer wishes to view 2D images although 3D images are output through the screen, the image display device may generate and transmit new synchronization information, and the 3D glasses 150 may control the lenses to be opened or shut according to the transmitted synchronization information so that the viewer views the output 3D images as 2D images without removing the 3D glasses 150.

In other words, the image display device generates and provides synchronization information to control both the lenses of the 3D glasses 150 to be opened at each time when left eye image data are output, i.e. at time t1 and time t3, and to control both the lenses of the 3D glasses 150 to be shut at each time when right eye image data are output, i.e. at time t2 and time t4. The 3D glasses 150 open and shut both the lenses at each time based on the synchronization information so that the viewer views the output 3D images as 2D images.

Figure 5:
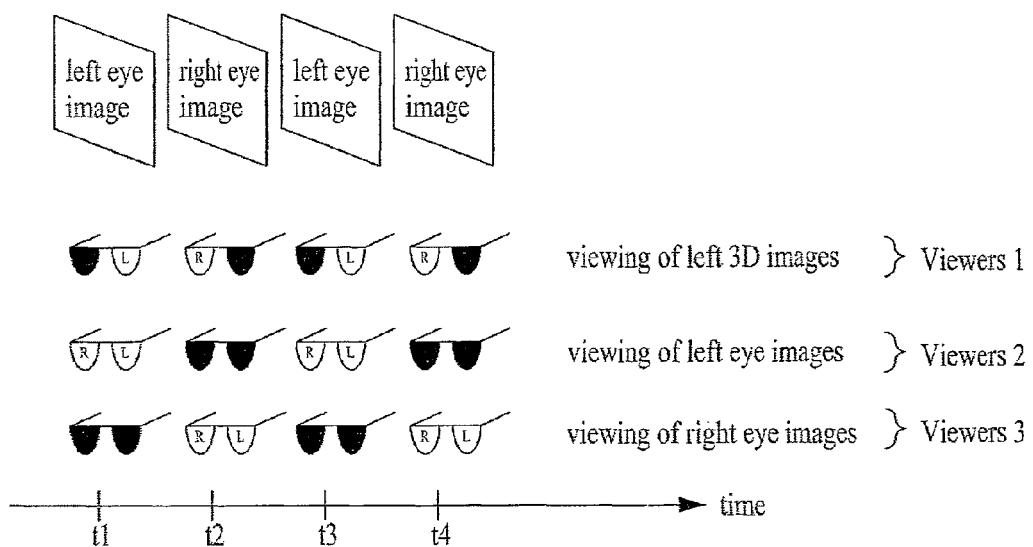
FIG. 5 is a view illustrating a method of, in a case in which a plurality of viewers views 3D images according to the present invention, differently setting and controlling viewing modes with respect to respective viewers.
Figure 6:
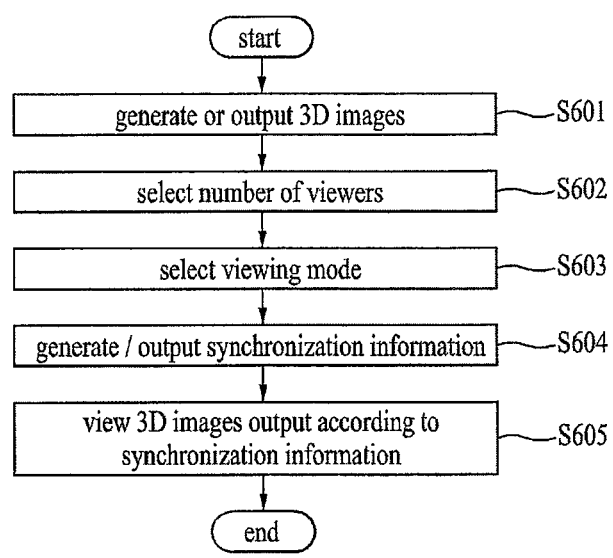
FIG. 6 is a flow chart illustrating a setting and control process of FIG. 5.
Figure 7:
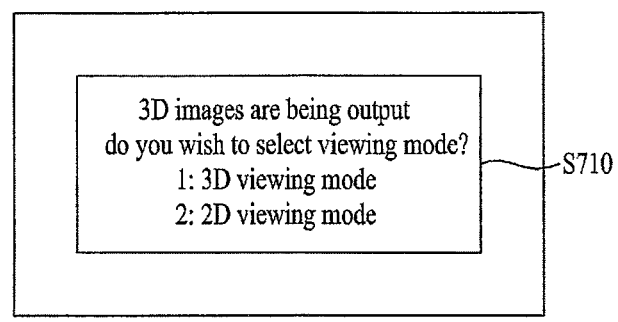
FIG. 7 is a view showing a user interface (UI) used in the setting and control process of FIG. 5.
Figure 7:
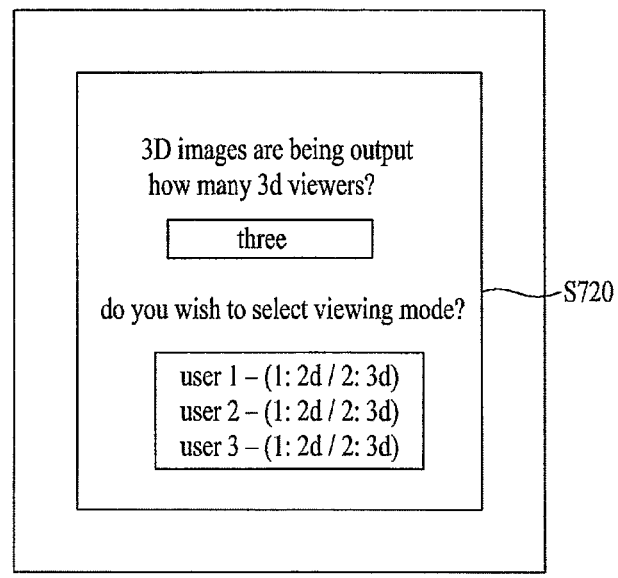

FIG. 5 is a view illustrating a method of in a case in which a plurality of viewers views 3D images according to the present invention, differently setting and controlling viewing modes with respect to respective viewers. FIG. 6 is a flow chart illustrating a setting and control process of FIG. 5. FIG. 7 is a view showing a UI used in the setting and control process of FIG. 5.

FIGS. 5 to 7 illustrate controlling image display so that viewers can selectively view a two-dimensional (2D) service or a three-dimensional (3D) service simultaneously, for example, with respect to a channel (or a service) or content which is provided on a screen and can be served in 3D. FIG. 5 also illustrates controlling image display so that the viewing mode can be changed to another viewing mode during viewing in the existing viewing mode, i.e. the 2D mode or the 3D mode.

FIGS. 5 to 7 illustrate an image display control process in a case in which 3D images are provided on the screen, and a plurality of viewers (viewer 1, viewer 2, and viewer 3) simultaneously views the 3D images.

Hereinafter, an image display process shown in FIG. 6 will be described with reference to FIGS. 5 and 7.

The image display device receives content from the content source 110 or through the external input 120. In this process, a viewer selects a desired viewing mode from a UI shown in FIG. 7(*a*).

The image display device generates 3D images from the received content according to the selected viewing mode (for example, a 3D viewing mode) and outputs the generated 3D images through the screen (S601).

In a case in which a plurality of viewers (viewer 1, viewer 2, and viewer 3) simultaneously view the 3D images as shown in FIG. 5, the number of viewers is input in response to a question of "How many 3D viewers?" from an UI shown in FIG. 7(*b*) (S602).

When a plurality of viewers has been selected at step S602, a viewing mode for each viewer is selected from a UI to select a viewing mode for each viewer in response to a question of "Do you wish to select a viewing mode?" from the UI shown in FIG. 7(*b*) (S603).

Referring to FIG. 5 or 7(*b*), viewer 1 has selected a 3D viewing mode, and viewer 2 and viewer 3 have selected a 2D viewing mode. Also, in FIG. 5, viewer 2 opens both lenses at each time when left eye image data are output, i.e. at time t1 and time t3, and shuts both the lenses at each time when right eye image data are output, i.e. at time t2 and time t4, according to the 2D viewing mode. On the other hand, viewer 3 opens both the lenses at each time when the right eye image data are output, i.e. at time t2 and time t4, and shuts both the lenses at time t1 and time t3.

When basic preparation and setting for 3D image viewing are completed through step S601 to step S603, the image display device generates synchronization information suitable for each viewer based on the viewing modes set by the respective viewers according to the setting and transmits the generated synchronization information to the glasses via the IR emitter 270 (S604).

Each viewer views the 3D images output through the screen based on the synchronization information transmitted from the image display device in 2D or 3D (S605).

According to circumstances, step S603 may be omitted. For example, FIG. 5 or 7(*b*) illustrates that a plurality of viewers selects different viewing modes. If all of the viewers select the same viewing mode, on the other hand, step S603 may be omitted.

At step S602, however, if the number of viewers is more than one, it is necessary to receive synchronization information generated and output by the image display device so that each viewer can view images output through the screen in a desired viewing mode (even in the same viewing mode), unlike step S603.

If a plurality of viewers has been input or selected at step S602, the image display device detects glasses 150 to be synchronized according to a predetermined wired/wireless protocol and identifies the glasses through exchange of information with the detected glasses.

This may be used to provide synchronization information according to setting of a viewing mode of each viewer. Even before step S602, however, the image display device may automatically detect the glasses, identify the glasses through exchange of information with the detected glasses, and store the corresponding information when the image display device is turned on.

Also, the US shown in FIG. 7(*a*) may be identically used even in a case in which there is one viewer in addition to when initial viewing is commenced as previously described.

FIGS. 8 to 11 illustrate controlling viewing mode change during viewing of images output through the screen of the image display device. Also, FIGS. 8 to 11 illustrate that there is one viewer for the convenience of description. However, the present invention is not limited thereto. In a case in which a plurality of viewers is present, the same or similar method may be applied to each viewer.

Figure 8:
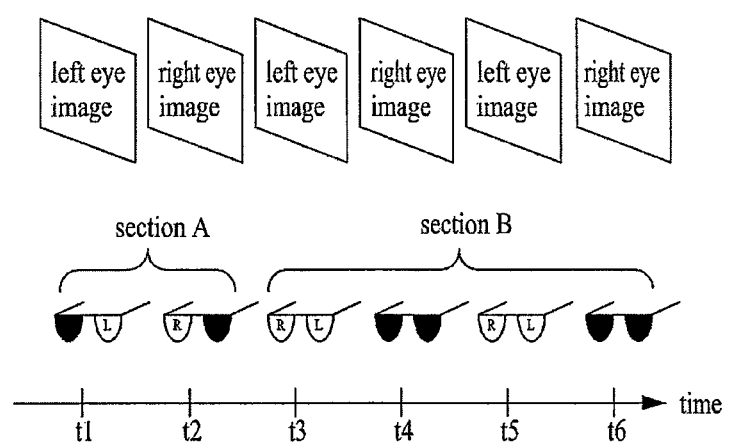
FIG. 8 is a view illustrating an example of viewing mode change according to the present invention.
Figure 9:
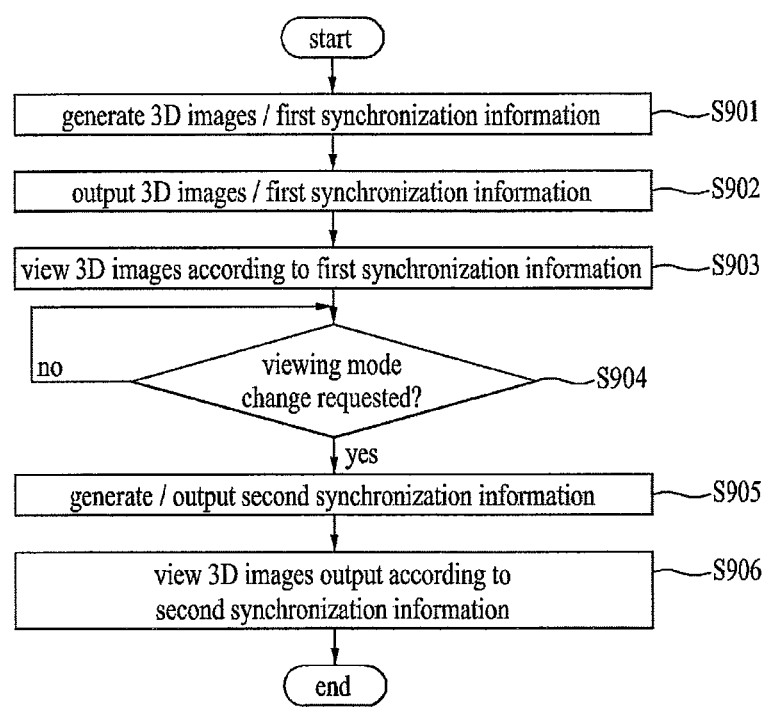
FIG. 9 is a flow chart illustrating a viewing mode change process of FIG. 8.
Figure 10:
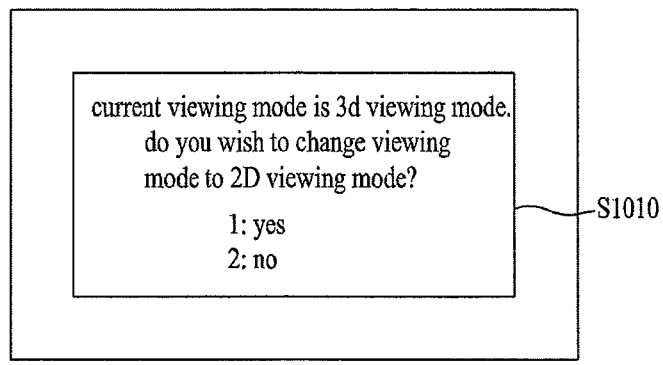
FIG. 10 is a view showing an example of a UI used in the viewing mode change process of FIG. 8.

FIG. 8 is a view illustrating an example of viewing mode change according to the present invention. FIG. 9 is a flow chart illustrating a viewing mode change process of FIG. 8. FIG. 10 is a view showing an example of a UI used in the viewing mode change process of FIG. 8.

Referring to FIGS. 8 to 10, there is one viewer, and left eye image data and right eye image data are alternately output from time t1 to time t6.

Hereinafter, the viewing mode change process will be described in more detail. Here, it is assumed that 3D images are basically output through the screen.

The image display device generates content received from the content source or the external input device in the form of 3D images to be output to the screen through the 3D image formatter 250, and generates time information, i.e. first synchronization information, regarding output of the generated 3D images (S901).

The image display device outputs the first synchronization information generated at step S901 to the 3D glasses 150, and, after that time or at the same time, outputs the 3D images through the screen (S902).

A viewer views the 3D images output through the screen using the 3D glasses 150 based on the first synchronization information received at step S902 (S903).

Here, it is assumed that the initial viewing mode is a 3D viewing mode, and a viewing mode to be changed, which will hereinafter be described, is a 2D viewing mode.

Subsequently, the image display device determines whether a viewing mode change request has been received from the viewer (S904).

Upon determining at step S904 that the viewing mode change request has been received from the viewer through an external input unit, such as a remote controller, the image display device outputs a UI shown in FIG. 10 through the screen so that the viewer can selected a desired viewing mode.

For example, in the UI of FIG. 10, the current viewing mode, i.e. a message of "The current viewing mode is a 3D viewing mode", is provided, and then a message of "Do you wish to change the viewing mode to a 2D viewing mode?" is provided so that the viewer selects viewing mode change. Here, it is assumed that the 2D viewing mode and the 3D viewing mode are provided as the viewing modes, and a message of asking change to the corresponding viewing mode is provided. If three are a large number of viewing modes, on the other hand, the viewing modes may be provided so that the viewer can select a desired mode from the provided viewing modes.

When the viewing mode has been changed according to viewer request at step S904, in other words, when the viewer views the images in the 3D mode at time t1 and time t2 and requests viewing mode change to the 2D mode through the UI shown in FIG. 10 at the same time as time t3 or before time t3, referring to FIG. 8, the image display device changes the viewing mode to the requested viewing mode, outputs 3D images through the screen according to the selected viewing mode, generates second synchronization information suitable for the selected viewing mode, and outputs the generated second synchronization information to the glasses 150 of the viewer through the IR emitter 270 (S905).

The viewer views the images of the 3D format as 2D images through the glasses 150 according to the second synchronization information (S906).

If the viewer feels tired due to viewing of the 3D image for a long period of time or requests change to the 2D mode without maintaining the 3D mode, the change process may be carried out as follows.

For example, as shown in FIGS. 8 to 10, the image display device provides the UI shown in FIG. 10 according to the viewing mode change request. When the viewer selects a specific viewing mode through the provided UI, the image display device constructs new synchronization information suitable for the selected viewing mode and provides the synchronization information to the glasses 150 of the viewer through the IR emitter 270. The glasses 150 control the lenses to be opened or shut according to the newly received synchronization information instead of the previously received synchronization information so that a viewer can view images output on the screen. This has already been described above.

According to another method, the image display device provides the UI 1010 shown in FIG. 10 according to the viewing mode change request. When the viewer selects a specific viewing mode through the provided UI 1010, the image display device outputs only left eye image data or right eye image data constituting the 3D images output according to the selected viewing mode. In this case, if the viewer still wears the glasses, synchronization information may be reconstructed so that the lenses of the glasses are shut at each time when image data are not output.

Figure 11:
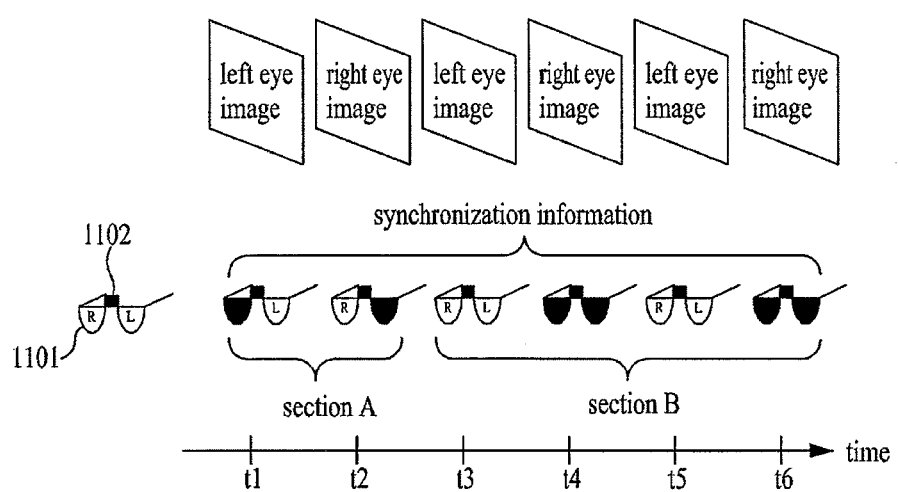
FIG. 11 is a view illustrating another example of a viewing mode change process according to the present invention.

According to a further method, the image display device continues to output images in the same sequence irrespective of a viewing mode change request. As shown in FIG. 11, however, a viewing mode change unit 1102 is provided at the glasses 1101. As previously described, an additional UI is not provided but a plurality of predetermined modes may be sequentially changed through the viewing mode change unit 1102.

FIG. 11 is a view illustrating another example of the viewing mode change process according to the present invention.

Referring to FIG. 11, when the viewer views the images in a 3D mode in section A, i.e. at time t1 and time t2, and changes the viewing mode through the viewing mode change unit 1102 before section B, i.e. time t3, as shown in FIG. 8, the lenses are controlled to be opened and shut so that the viewers views the images in a 2D mode.

FIGS. 8 and 11 illustrate the viewing mode change processes; however, the viewing mode change processes are greatly different from each other.

For example, in FIG. 8, the image display device provides the UI shown in FIG. 10 according to the viewing mode change request to guide viewer selection of the viewing mode. When the viewer selects the viewing mode through the UI, the image display device newly constructs synchronization information according to the selected viewing mode and provides the newly constructed synchronization information to the glasses. The glasses control the lenses to be opened and shut according to the newly constructed synchronization information.

On the other hand, in FIG. 11, the image display device does not perform any operation during the viewing mode change process, unlike FIG. 8. In other words, the image display device may not provide the UI shown in FIG. 10.

In this case, the glasses 1101 newly construct synchronization information. However, the newly constructed synchronization information is modified to be suitable for the viewing mode change request based on the previously received synchronization information from the image display device.

For example, in FIG. 11, the left eye image data are output at time t1 in section A, and therefore, the left eye lens L is opened, and the right eye lens is shut. On the other hand, the right eye image data are output at time t2, and therefore, the right eye lens R is opened, and the left eye lens is shut.

Subsequently, when the viewer selects viewing mode change through the viewing mode change unit 1102 mounted to the glasses at the same time as time t3 or before time t3, i.e. requests viewing change from the 3D mode in section A to the 2D mode in section B, both the lenses may be controlled to be opened at each time when the left eye image data are output, i.e. at time t3 and t5, and both the lenses may be controlled to be shut at each time when the right eye image data are output, i.e. at time t4 and t6 in section B based on the previously received synchronization information so that the viewer can view the images in the 2D mode. In this case, the synchronization information is reconstructed based on the left eye image data for the 2D mode. On the other hand, the synchronization information may be reconstructed based on the right eye image data so that the viewers can view the images.

The above description is mainly applied to an active type, such as a liquid crystal shutter or an electronic shutter. A passive type, such as a polarized light lens, may be constructed as follows.

Figure 12:
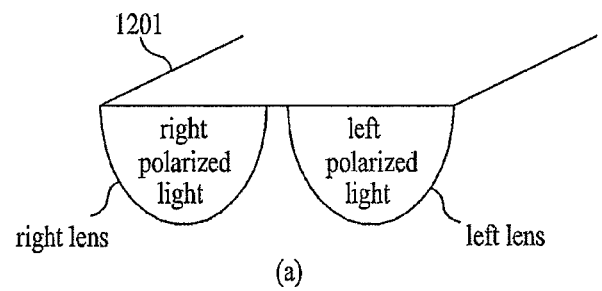
FIG. 12 is a view illustrating a case in which viewing in various viewing modes is performed with respect to a single screen in a passive type according to the present invention.
Figure 12:
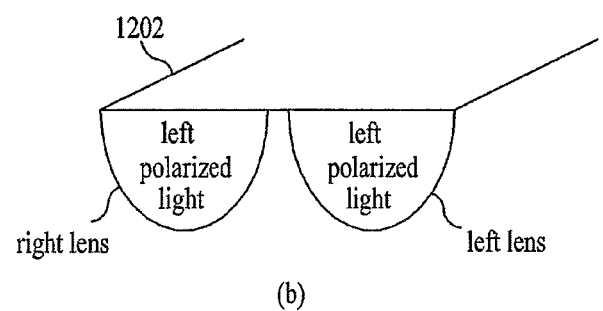
Figure 12:
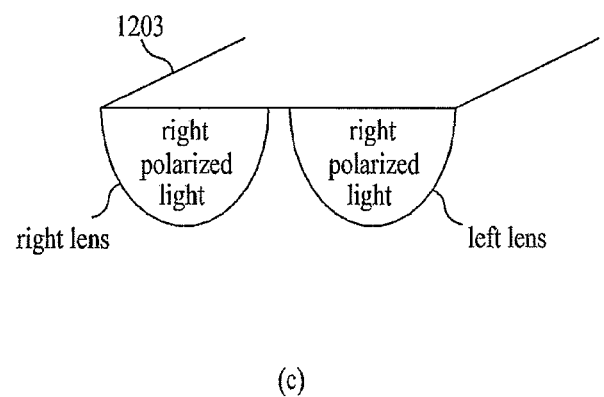

FIG. 12 is a view illustrating a case in which viewing in various viewing modes is performed with respect to a single screen in a passive type according to the present invention.

Referring to FIG. 12, in the passive type, it is not possible to change the viewing mode through sync change, unlike the aforementioned active type. This is due to characteristics of the passive type. Polarized light lenses use polarized light characteristics of the displaying part 140 of the image display device. For example, FIG. 12(a) illustrates polarized light lenses 1201 for viewing in a 3D mode.

FIGS. 12(b) and 12(c) respectively illustrate polarized light lenses 1202 and 1203 for viewing in a 2D mode.

As previously described, the polarized light lenses are light, provide low dizziness, and are inexpensive as compared with the liquid crystal shutter. In connection with the present invention, however, the viewing mode may be changed as follows.

For example, at least two polarized light lenses as shown in FIG. 12(a) and 12(b) or 12(c) may be provided, and, when the viewing mode is changed, the polarized light lens suitable for the changed viewing mode may be put on.

As another method, in a case in which polarized light lenses can be separated from the glasses, one of the lenses may be separated from the glasses and another polarized light lens may be mounted to the glasses when the viewing mode is changed.

[Mode for Invention]

As described above, various embodiments have been described in the best mode for carrying out the invention.

According to the present invention with the above-stated configuration, it is possible for viewers to selectively view a two-dimensional (2D) service or a three-dimensional (3D) service simultaneously with respect to a channel (or a service) or content which is provided on a screen and can be served in 3D, to change another mode during viewing in a 2D mode or a 3D mode, and to easily control image display using a UI.

[Industrial Applicability]

As described above, the present invention is entirely or partially applicable to a digital broadcasting system.

The invention claimed is:

1. An image display method comprising:
    generating three dimensional, 3D, image data to be output from an input source;
    receiving first information representing whether a plurality of viewers are present and representing the number of viewers in a case in which a plurality of viewers are present and second information representing a viewing mode of each viewer based on the first information;
    individually generating synchronization information of the generated 3D image data in response to the viewing mode of each viewer according to the received first information and second information; and
    outputting the generated 3D image data through a screen and transmitting the generated synchronization information to 3D glasses of each viewer.

2. The image display method according to claim 1, wherein the viewing mode comprises a 2D viewing mode and a 3D viewing mode.

3. The image display method according to claim 2, further comprising:
    detecting at least one pair of 3D glasses connected through a wired/wireless network;
    identifying the detected at least one pair of 3D glasses; and
    storing identification information representing the identified 3D glasses.

4. The image display method according to claim 3, wherein the synchronization information comprises information to control both lenses of the 3D glasses to be shut at each time when left eye image data or right eye image data constituting the generated 3D image data are output for a viewer selecting the 2D viewing mode.

5. The image display method according to claim 2, further comprising:
    detecting at least one pair of 3D glasses connected through a wired/wireless network;
    receiving identification information communicated with the detected at least one pair of 3D glasses; and
    identifying the detected at least one pair of 3D glasses by comparing the received identification information with previously stored identification information.

6. The image display method according to claim 5, wherein the synchronization information comprises information to control both lenses of the 3D glasses to be shut at each time when left eye image data or right eye image data constituting the generated 3D image data are output for a viewer selecting the 2D viewing mode.

7. An image display method comprising:
    generating 3D image data to be output from an input source
    receiving first information representing whether a plurality of viewers are present and representing the number of viewers in a case in which a plurality of viewers are present and second information representing a viewing mode of each viewer based on the first information; and
    individually generating the first synchronization information of the generated 3D image data in response to the viewing mode of each viewer according to the received first information and second information;
    outputting the generated 3D image data through a screen and transmitting the generated first synchronization information to 3D glasses of each viewer;
    generating second synchronization information based on the generated first synchronization information according to a request for changing viewing mode; and
    transmitting the generated second synchronization information to 3D glasses of the corresponding viewer.

8. The image display method according to claim 7, further comprises identifying a viewer requesting for changing the viewing mode, wherein the generated second synchronization information is transmitted to 3D glasses of the identified viewer.

9. An image display apparatus comprising:
    an external input receiving part configured to receive first information representing whether a plurality of viewers are present and representing the number of viewers in a case in which a plurality of viewers are present and second information representing a viewing mode of each viewer based on the first information;
    a three dimensional, 3D, image formatter configured to generate 3D image data to be output from an input source and to individually generate synchronization information in response to the viewing mode of each viewer according to the received first information and second information for the generated 3D image data;
    an IR emitter configured to transmit the individually generated synchronization information to 3D glasses of each viewer; and
    an outputting part configured to output the generated 3D image data.

10. The image display apparatus according to claim 9, further comprising:
    a communication module configured to detect at least one pair of 3D glasses connected through a wired/wireless network;
    an identifying part configured to identify the detected at least one pair of 3D glasses; and
    a storage part configured to store identification information for the identified 3D glasses.

11. The image display apparatus according to claim 10, wherein the 3D image formatter generates synchronization information to control both lenses of the 3D glasses to be shut at each time when left eye image data or right eye image data constituting the generated 3D image data are output for a viewer selecting a 2D viewing mode based on the received second information.

12. The image display apparatus according to claim 9, further comprising:
    a communication module configured to detect at least one pair of 3D glasses connected through a wired/wireless network and to communicate with the detected at least one pair of 3D glasses to receive identification information; and
    an identifying part configured to compare the received identification information with previously stored identification information to identify the detected at least one pair of 3D glasses.

13. The image display apparatus according to claim 12, wherein the 3D image formatter generates synchronization information to control both lenses of the 3D glasses to be shut at each time when left eye image data or right eye image data constituting the generated 3D image data are output for a viewer selecting a 2D viewing mode based on the received second information.

14. An image display apparatus comprising:
- a three dimensional, 3D, image formatter configured to generate 3D image data to be output from an input source and first synchronization information;
- an IR emitter configured to transmit the generated first synchronization information to 3D glasses of each viewer;
- an outputting part configured to output the generated 3D image data on a screen; and
- an external input receiving part configured to receive a request for changing viewing mode from a viewer,
- wherein the 3D image formatter generates second synchronization information based on the generated first synchronization information according to the received request for changing viewing mode and outputs the generated second synchronization information to the 3D glasses of the corresponding viewer via the IR emitter.

15. The image display apparatus according to claim 14, wherein the external input receiving part is further configured to receive first information representing whether a plurality of viewers are present and representing the number of viewers in a case in which a plurality of viewers are present and second information representing a viewing mode of each viewer based on the first information.

16. The image display apparatus according to claim 15, wherein the 3D image formatter is configured to individually generate the first synchronization information of the generated 3D image data in response to the viewing mode of each viewer according to the received first information and second information.

17. The image display apparatus according to claim 16, further comprising:
- a communication module configured to detect at least one pair of 3D glasses connected through a wired/wireless network;
- an identifying part configured to identify the detected at least one pair of 3D glasses; and
- a storage part configured to store identification information for the identified 3D glasses.

18. The image display apparatus according to claim 16, further comprises a communication module configured to identify a viewer requesting for changing the viewing mode.

19. The image display apparatus according to claim 16, further comprising:
- a communication module configured to detect at least one pair of 3D glasses connected through a wired/wireless network and to receive identification information communicated with the detected at least one pair of 3D glasses; and
- an identifying part configured to identify the detected at least one pair of 3D glasses by comparing the received identification information with previously stored identification information.

* * * * *